United States Patent
Voelckel et al.

[11] Patent Number: 6,058,129
[45] Date of Patent: May 2, 2000

[54] LASER WITH DIFFERENT EMISSION DIRECTIONS

[75] Inventors: Hermann Voelckel, Kahla; Guenter Hollemann, Jena; Ralf Koch, Berlin, all of Germany

[73] Assignee: Jenoptik Aktiengesellschaft, Jena, Germany

[21] Appl. No.: 08/995,353

[22] Filed: Dec. 22, 1997

[30] Foreign Application Priority Data

Dec. 20, 1997 [DE] Germany .......................... 196 53 546

[51] Int. Cl.$^7$ ...................................................... H01S 3/082
[52] U.S. Cl. ................................ 372/97; 372/93; 372/108
[58] Field of Search .................... 372/97, 92, 93, 372/39, 108

[56] References Cited

U.S. PATENT DOCUMENTS

| | | | |
|---|---|---|---|
| 3,432,767 | 3/1969 | Pole et al. | 372/97 |
| 3,959,684 | 5/1976 | deWitte et al. | 372/97 |
| 3,969,684 | 7/1976 | De Witte et al. | |
| 4,093,924 | 6/1978 | Farcy | 372/93 |
| 4,156,852 | 5/1979 | Hagen | 372/97 |
| 4,779,286 | 10/1988 | Wheatley | 372/97 |
| 5,119,389 | 6/1992 | Amano | 372/97 |
| 5,210,764 | 5/1993 | Bucher et al. | 372/9 |
| 5,249,196 | 9/1993 | Scheps | 372/92 |

FOREIGN PATENT DOCUMENTS

| | | |
|---|---|---|
| 33 01 091 | 8/1983 | Germany . |
| 40 23 571 | 2/1992 | Germany . |
| 41 10 189 | 10/1992 | Germany . |

*Primary Examiner*—Leon Scott, Jr.
*Attorney, Agent, or Firm*—McAulay Nissen Goldberg Kiel & Hand, LLP

[57] ABSTRACT

A laser comprises an active element and two resonators wherein each resonator further comprises a highly reflective resonator element and an output coupling element which reflects the radiation of the active element in itself. The active element amplifies incident radiation from a solid angle range by a normal of the active element which is distinctly greater than zero. The resonators are arranged relative to the active element such that each resonator reflects the radiation on the active element at a different angle of incidence within the solid angle range.

7 Claims, 3 Drawing Sheets

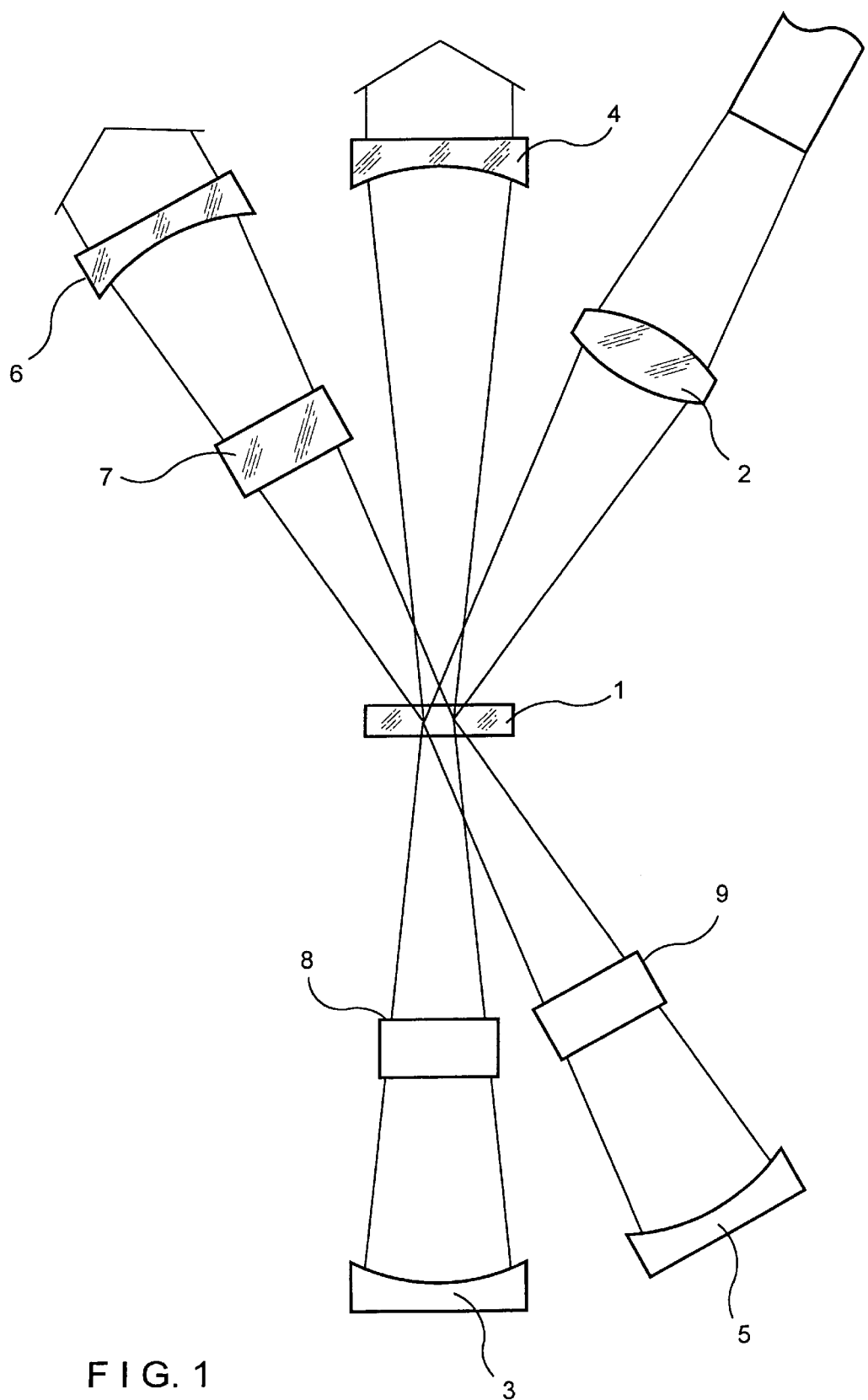
F I G. 1

LASER WITH DIFFERENT EMISSION DIRECTIONS

BACKGROUND OF THE INVENTION a) Field of the Invention

Lasers comprise an active element which is pumped by a radiation source generally by means of coupling optics and a resonator. The resonator makes laser operation possible by means of optically coupling back through a partially transparent or partially reflecting output coupling element and a highly reflective resonator element.

b) Description of the Related Art

Solid-state lasers are distinguished over other lasers particularly by the large number of possible modes of operation. For example, it is possible to realize the following modes of operation through the choice of a suitable resonator arrangement:

1. continuous-wave operation or pulsed laser operation;
2. transverse basic-mode operation with approximately diffraction-limited beam or operation at reduced radiation intensity;
3. coupling out of the fundamental radiation in the infrared spectral region or frequency conversion by means of generating higher harmonics in the visible or ultraviolet spectral range or by means of other optically nonlinear frequency conversion methods (combination laser);
4. oscillation at various laser wavelengths for media emitting on many discrete lines as well as for continuously tunable vibronic solid-state lasers such as, e.g., titanium:sapphire lasers with continuous spectra (multiwavelength lasers);
5. cascade lasers in which the solid-state laser emission pumps a second crystal;
6. one or more active elements in a resonator.

There are a great many applications in which different modes of operation are required alternately or simultaneously. For example, alternating or simultaneous laser radiation of different wavelength is required in laser surgery for cutting and coagulating tissue or in laser materials processing.

In order to realize different laser radiation in one device, a technically trivial solution would be to accommodate a plurality of lasers within the device housing (e.g., DE 28 09 007 A1). However, the number of lasers is strictly limited by the proportionate increase in the size, weight and cost of the device. If the desired laser radiation is simply a matter of radiation of different wavelengths which is achievable in theory with the same active element, this laser radiation can be generated with only one laser, as is known from the prior art. In that case, the laser comprises, in addition to the active element, a plurality of resonators, each of which reflects one of the desired wavelengths.

In all of the solutions known from the prior art, the position of the optical axis for the resonator construction is given by the geometry of the active element (e.g., rod-shaped). This means particularly that if there are a plurality of resonators they must be arranged collinearly and, as a consequence, resonator elements must be moved or a loss in effectiveness will occur through the use of prisms.

DE 37 13 635 A1 describes a laser for two wavelengths comprising an active element and two resonators which are formed from the same semitransparent exit mirror and a mirror having different reflection characteristics. The elements of the laser are arranged one behind the other on the optical axis determined by the active element as follows: semitransparent mirror, active element, first mirror, shutter, second mirror. The first mirror reflects the radiation of a first wavelength and lets pass the radiation of a second wavelength, while the second mirror reflects the radiation of the second wavelength. Alternatively, this laser can emit only laser radiation of either the first wavelength or the second wavelength by means of the shutter.

DE 35 00 900 A1 also describes a laser which can emit two different wavelengths alternatively. In this case, a gas cell arranged in the resonator space is either evacuated or filled with a suitable gas so that it acts as a spectrum-selective absorber. With the gas cell evacuated, the laser emits at 10.6 $\mu$m and is suitable for soft-tissue surgery. When the gas cell is filled with a suitable gas, the otherwise more intensive laser line of 10.6 $\mu$m is suppressed and the laser emits at 9.6 $\mu$m so that it is suitable for hard-tissue surgery.

The possibility of emission with two different wavelengths is provided in the laser according to DE 37 30 563 C1, e.g., by means of a prism inside the resonator chamber, which, by means of the different refraction of two emission wavelengths of the active element, deflects the respective radiation components onto different laser mirrors. The resonators can operate alternately or simultaneously due to these switches arranged in front of the laser mirrors.

The multiwavelength laser oscillator with geometrically coupled resonators according to DE 41 10 189 can emit laser radiation of more than two wavelengths. In this case, a polygonal prism with parallel side surfaces is arranged in the resonator space and, through rotation, puts the individual resonators into operation, each individual resonator being formed by the same output coupling unit and a special dispersive element.

All of the described solutions have in common that the resonator axes of the individual resonators of a laser are the same as the optical axis given by the active element. In order to put different resonators into operation, the radiation is either divided into its components of different wavelength by stationary elements such as filters and prisms or is deflected by moving elements onto highly reflective resonator elements having different reflection characteristics.

The first basic solution mentioned above causes a loss of effectiveness, while the second solution in particular sets strict requirements for adherence to the spatial and angular accuracy of the moving elements.

Further, the compulsory collinear arrangement of the resonators in the region of the active element allows only a very limited number of resonators.

All of the solutions known from the prior art have the decisive disadvantage that the resonators are not constructed so as to be independent from one another; rather, all of them use the same output coupling element. The laser therefore emits all of the radiation in one direction.

SUMMARY AND OBJECT OF THE INVENTION

The primary object of the invention is to provide a laser which can emit radiation of the same operating mode or radiation of a different operating mode in optional directions within a determined solid angle simultaneously or alternately.

This object is met in a laser according to the invention in that an active element is used which amplifies radiation occurring within a solid angle at a normal of the active element that is distinctly greater than zero, whereby the resonators are so arranged with respect to the active element that each beam reflects in another incident angle within the angle region on the active element. The active element is advantageously a laser crystal whose radial extension is greater than its axial extension. The greater the ratio between these two magnitudes, the greater the solid angle to the axis of the laser crystal which in this case represents the normal. Also, a collinear arrangement of resonators is not required in that the active element can amplify radiation having a different direction of incidence within this solid angle. The construction of a laser according to the invention can be appreciably simpler than that of comparable lasers of the prior art. The number of resonators that can be provided increases considerably. These resonators can be arranged independent from one another and so as to be variable with respect to their position relative to one another, so that optional emission directions can be realized within the solid angle. There are no effectiveness losses resulting from beam-dividing elements such as are conventional in the prior art.

Instead of a laser crystal, the active element could also be a solid-state laser medium of some other kind (e.g., laser glass or laser ceramic) or a laser medium in liquid form (e.g., dye laser) or gaseous form which is accommodated in an appropriately shaped cell.

The invention will be explained more fully with reference to embodiment examples.

BRIEF DESCRIPTION OF THE DRAWINGS

In the drawings:

FIG. 1 shows a first embodiment example with two resonators and a transmitting active element;

DESCRIPTION OF THE PREFERRED EMBODIMENTS

Figure 2:
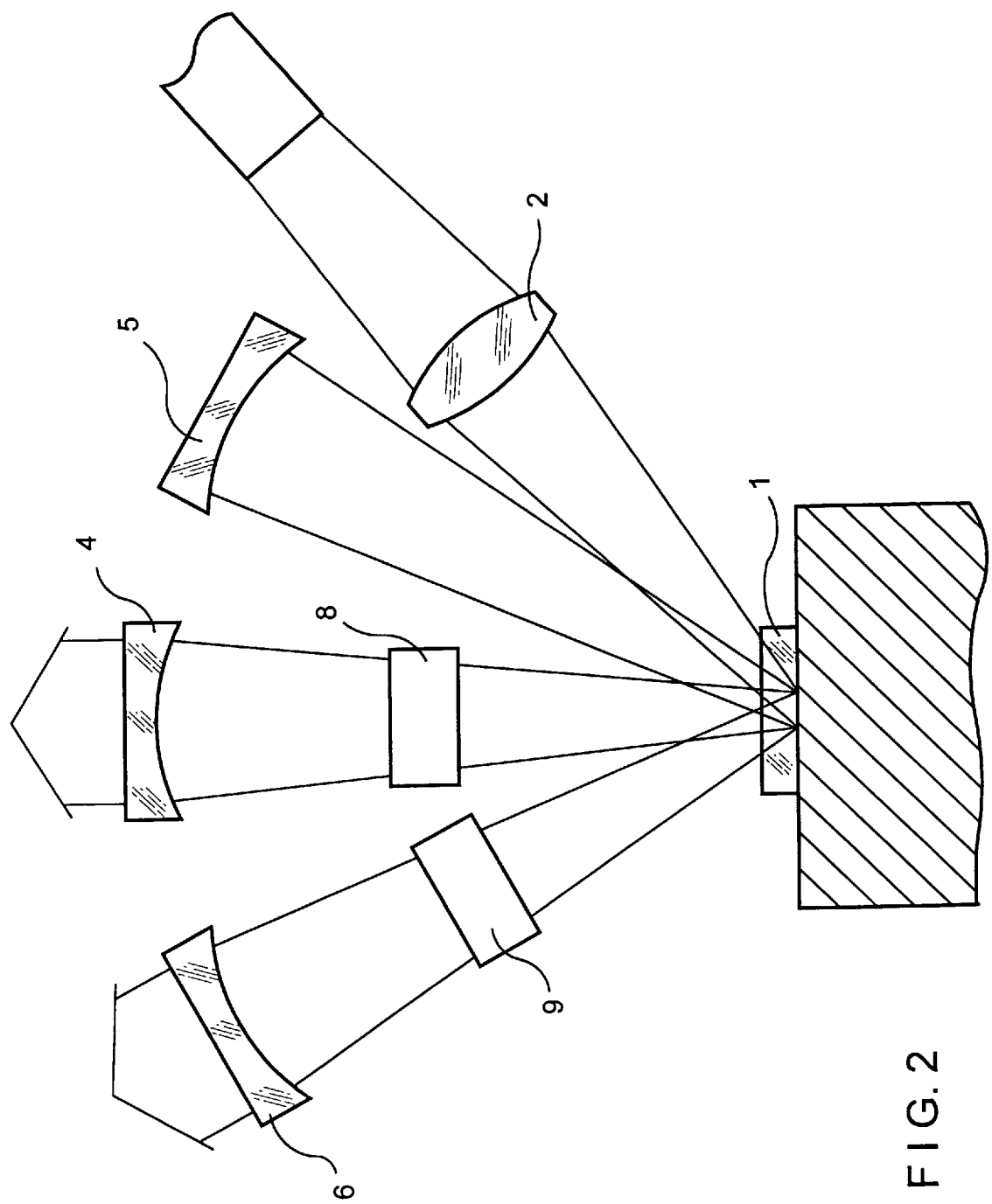
FIG. 2 shows a second embodiment example with two resonators and a reflective active element.

In the first embodiment example shown in FIG. 1, the active element is a disk-shaped laser crystal 1 whose radial extension is at least six times greater than its axial extension. As a result of this approximately two-dimensional geometry, an amplification is also effected in the laser crystal when the angle of incidence of the radiation relative to the axis of the laser crystal 1 is appreciably greater than 0° (the angle region is smaller than 90°); i.e., an amplification is also effected when the resonator is not arranged collinear to the axis of the laser crystal 1. Accordingly, it is possible to arrange a large number of resonators in a noncollinear manner relative to one another, which resonators use the same laser crystal as active element. The angle of incidence is advantageously less than 20°.

The disk-shaped laser crystal 1 is pumped by a fiber-coupled laser diode, not shown in the drawings, through coupling optics 2 and emits radiation in a determined wavelength spectrum from which the fundamental wavelength and the second harmonic are coupled out. The vertical radiation incidence on the laser crystal 1 was selected for the first resonator for amplification of the fundamental wavelength, i.e., a first resonator element 3 which is highly reflective for the fundamental wavelength and a first output coupling element 4 are so arranged relative to one another that the radiation reflected in itself runs in the axial direction of the laser crystal 1. The second resonator for emitting the first harmonic is inclined at an angle to the axis of the laser crystal 1, which permits the closest possible arrangement of the second resonator element 5 to the first resonator element 3 and of the second output coupling element 6 to the first output coupling element 4 and contains the nonlinear optical crystal 7. A first switch 8 is arranged forward of the first resonator element 3 and a second switch 9 is arranged forward of the second resonator element 5. The two resonators can operate alternatively or simultaneously by actuating the switches 8; 9. The laser accordingly emits either a radiation with the fundamental wavelength or with the second harmonic or with both wavelengths.

FIG. 2 shows a second embodiment example in which the active element is a reflecting disk-shaped laser crystal 1. This laser crystal 1 serves simultaneously as a first reflector element for a first resonator with a radiation incidence direction in the axial direction of the laser crystal 1. The first resonator further has a first switch 8 and a first output coupling element 4. A second resonator comprises a second output coupling element 5, a second switch 9, and a second highly reflecting resonator element 6. An advantageous secondary effect results from the use of a reflecting laser crystal 1 by means of the simple possibility for cooling through the arrangement of a heat sink.

Figure 3:
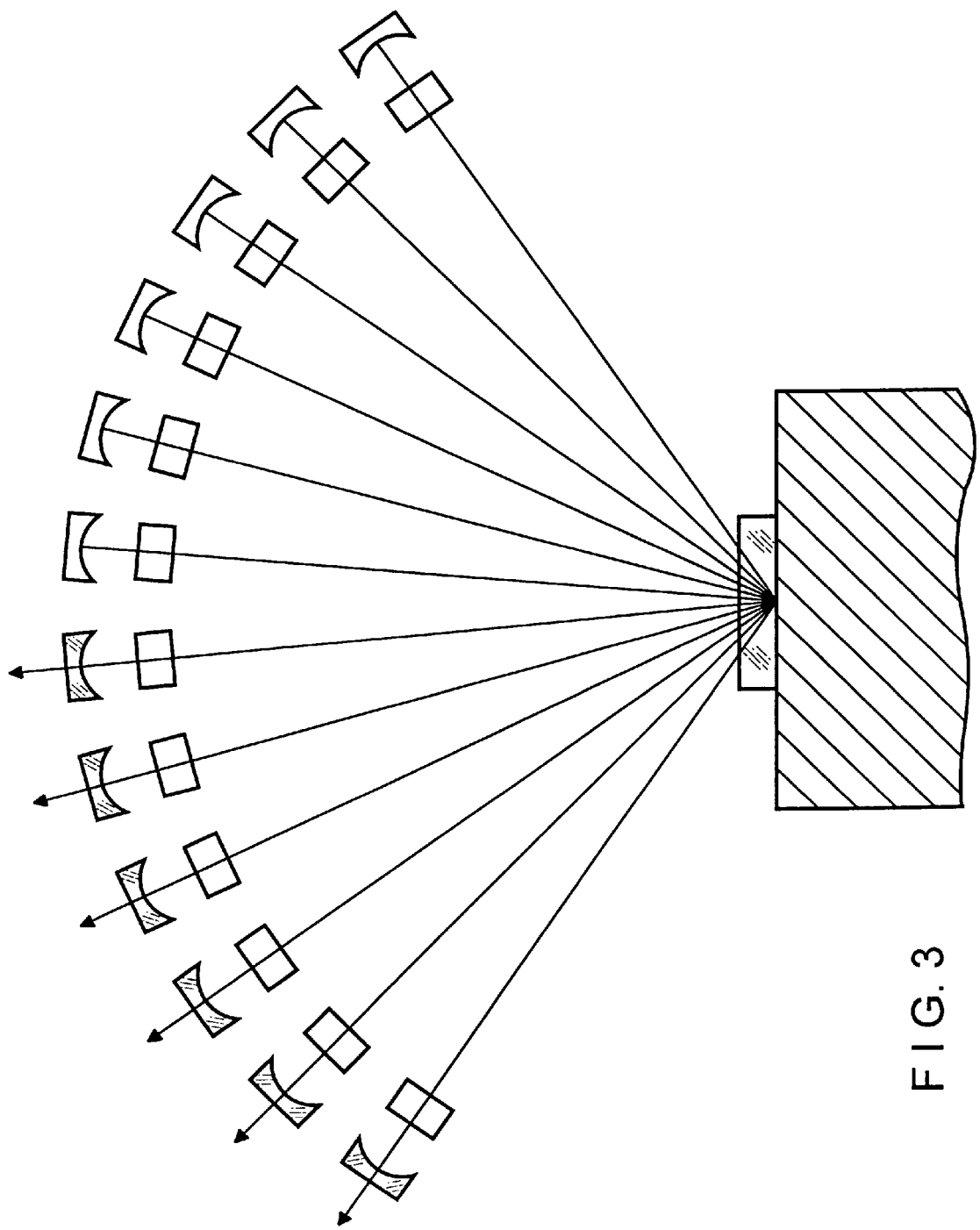
FIG. 3 shows a third embodiment example with n resonators and a reflective active element.

In a third embodiment example, FIG. 3 shows a laser with n resonators arranged in a plane. The exact number of resonators is determined by the incidence angle range capable of amplifying the active element and the geometric dimensions of the resonator element and output coupling element.

In a manner similar to the third embodiment example in other respects, the resonators in a fourth embodiment example are arranged three-dimensionally relative to one another. An appreciable increase in the number of possible reflectors and emission directions can be achieved once again by means of the three-dimensional arrangement.

In addition to the possibility of constructing a laser with a large number of resonators which requires no additional beam-influencing elements and which allows the realization of different operating modes alternatively or simultaneously, a laser according to the invention has the special advantage that a large number of different emission directions can be achieved.

While the foregoing description and drawings represent the preferred embodiments of the present invention, it will be obvious to those skilled in the art that various changes and modifications may be made therein without departing from the true spirit and scope of the present invention.

What is claimed is:

1. A laser comprising:
    an active element, said active element amplifying radiation received within a solid angle range, said solid angle range extending from a normal of a surface of the active element to an angle that is less than 90° relative to the normal; and
    a plurality of resonators,
    each of said resonators further comprising a highly reflective resonator element and an output coupling element for reflecting the radiation supplied from the active element back to the active element, each of said resonators supplying the respective radiation towards the active element at a respectively different angle relative to the normal of the surface of the active element, each of said respectively different angles being within the solid angle range.

2. The laser according to claim 1, wherein the active element has a radial extension and an axial extension and the radial extension is greater than the axial extension by a multiple and the axis serves as normal.

3. The laser arrangement according to claim 2, wherein the active element has an approximately two-dimensional geometry.

4. The laser according to claim 3, wherein the active element is a laser crystal.

5. The laser according to claim 3, wherein the active element is a laser glass.

6. The laser according to claim 3, wherein the active element is a laser ceramic.

7. A laser comprising:

an active element, said active element amplifying radiation received within a solid angle range, the solid angle range being 20° and extending from a normal of a surface of the active element to an angle of 20° relative to the normal; and a plurality of resonators, each of said resonators further comprising a highly reflective resonator element and an output coupling element for reflecting the radiation supplied from the active element back to the active element, each of said resonators supplying the respective radiation towards the active element at a respectively different angle relative to the normal of the surface of the active element, each of said respectively different angles being within the solid angle range.

* * * * *